US 11,853,292 B2

(12) United States Patent
Li et al.

(10) Patent No.: US 11,853,292 B2
(45) Date of Patent: Dec. 26, 2023

(54) EVALUATING DRIVING DATA WITH A MODULAR AND CONFIGURABLE EVALUATION FRAMEWORK

(71) Applicant: Woven by Toyota, U.S., Inc., Palo Alto, CA (US)

(72) Inventors: Shaojing Li, Mountain View, CA (US); Yingting Xiao, San Mateo, CA (US)

(73) Assignee: Woven by Toyota, U.S., Inc., Palo Alto, CA (US)

( * ) Notice: Subject to any disclaimer, the term of this patent is extended or adjusted under 35 U.S.C. 154(b) by 606 days.

(21) Appl. No.: 16/985,842

(22) Filed: Aug. 5, 2020

(65) Prior Publication Data

US 2022/0043804 A1    Feb. 10, 2022

(51) Int. Cl.
| | |
|---|---|
| *G06F 16/23* | (2019.01) |
| *G07C 5/02* | (2006.01) |
| *G07C 5/00* | (2006.01) |
| *G07C 5/08* | (2006.01) |

(52) U.S. Cl.
CPC ...... *G06F 16/2379* (2019.01); *G06F 16/2365* (2019.01); *G07C 5/006* (2013.01); *G07C 5/02* (2013.01); *G07C 5/08* (2013.01)

(58) Field of Classification Search
None
See application file for complete search history.

(56) References Cited

U.S. PATENT DOCUMENTS

| | | | | |
|---|---|---|---|---|
| 2017/0313323 | A1* | 11/2017 | Tseng | B60W 50/0097 |
| 2020/0380301 | A1* | 12/2020 | Siracusa | G06F 18/2193 |
| 2021/0055915 | A1* | 2/2021 | Guo | G06F 3/0486 |
| 2021/0294877 | A1* | 9/2021 | Konrardy | G01C 21/343 |

* cited by examiner

*Primary Examiner* — Adam D Tissot
*Assistant Examiner* — Garrett F Evans
(74) *Attorney, Agent, or Firm* — Christopher G. Darrow; Darrow Mustafa PC

(57) ABSTRACT

In one embodiment, a method includes receiving a request for evaluating driving data included in a data log, accessing, based on the request, an evaluation configuration file that includes a metric-calculation configuration specifying one or more metric calculators configured to generate one or more output metrics from the driving data and a validation configuration configured to validate the one or more output metrics, instantiating the one or more metric calculators specified by the metric-calculation configuration included in the evaluation configuration file, determining particular driving data from the driving data included in the data log based on the one or more instantiated metric calculators, and generating the one or more output metrics for the particular driving data by using the instantiated one or more metric calculators.

20 Claims, 5 Drawing Sheets

US 11,853,292 B2

EVALUATING DRIVING DATA WITH A MODULAR AND CONFIGURABLE EVALUATION FRAMEWORK

BACKGROUND

Evaluation is a systematic determination of a subject's merit, worth and significance, using criteria governed by a set of standards. It can assist an organization, program, design, project or any other intervention or initiative to assess any aim, realizable concept/proposal, or any alternative, to help in decision-making; or to ascertain the degree of achievement or value in regard to the aim and objectives and results of any such action that has been completed. The primary purpose of evaluation, in addition to gaining insight into prior or existing initiatives, is to enable reflection and assist in the identification of future change. Evaluation is often used to characterize and appraise subjects of interest in a wide range of human enterprises, including the arts, criminal justice, foundations, non-profit organizations, government, health care, and other human services. It is long term and done at the end of a period of time.

DESCRIPTION OF EXAMPLE EMBODIMENTS

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1A:
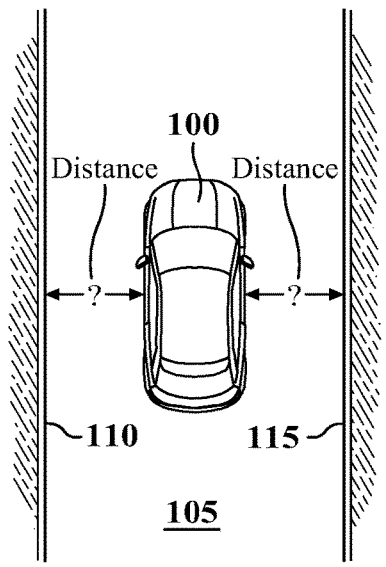
FIG. 1A illustrates an example scenario where evaluation is required for distance to lane boundaries.
Figure 1B:
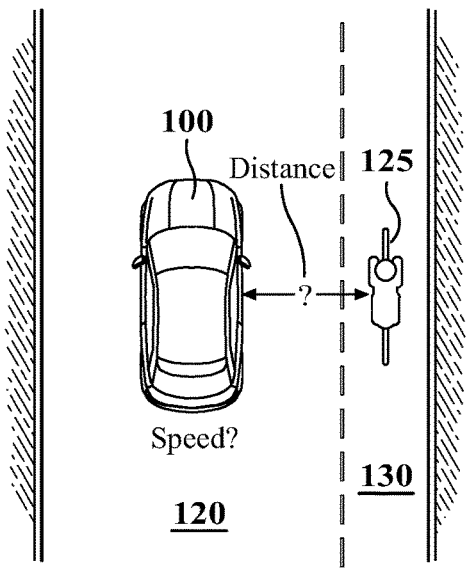
FIG. 1B illustrates an example scenario where evaluation is required for distance and speed.
Figure 1C:
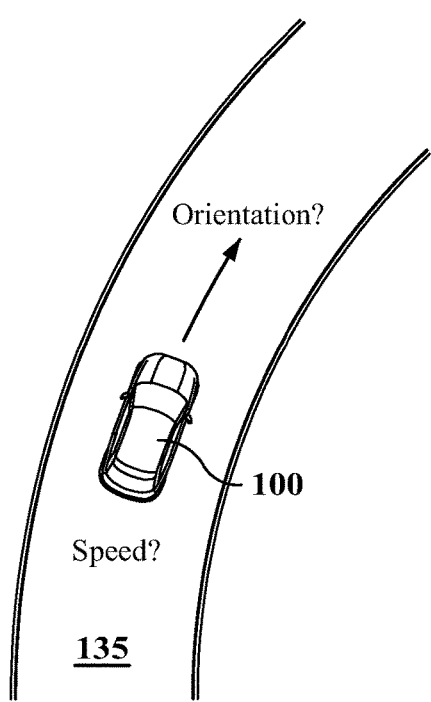
FIG. 1C illustrates an example scenario where evaluation is required for orientation and speed.
Figure 1D:
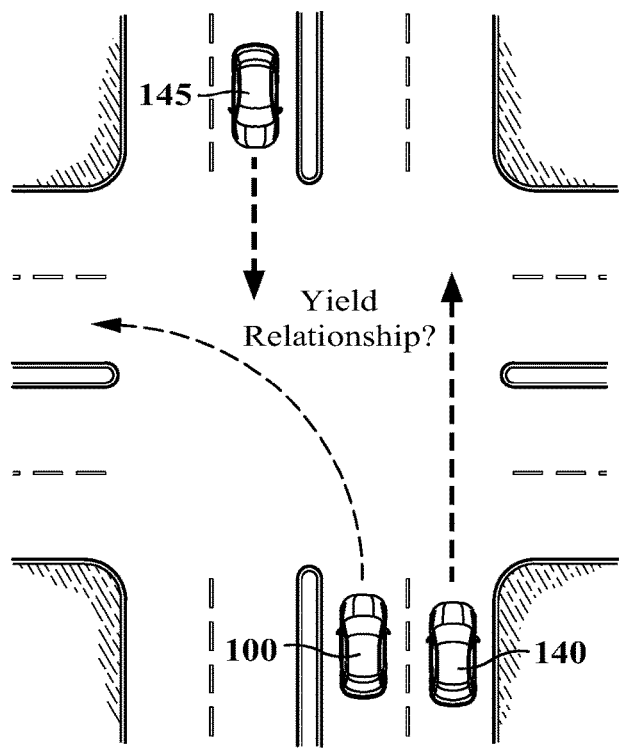
FIG. 1D illustrates an example scenario where evaluation is required for yield relationship.

Developers/engineers may need to perform regression tests, feature performance tests, and various other evaluations for driving data associated with different scenarios. FIGS. 1A-1D illustrate example scenarios associated with driving data for evaluations. FIG. 1A illustrates an example scenario where evaluation is required for distance to lane boundaries. As indicated in FIG. 1A, a vehicle 100 may be driving in a lane 105. A developer/engineer may need to evaluate the distance of the vehicle 100 to the left lane boundary 110 and right lane boundary 115 based on driving data associated with such scenario. FIG. 1B illustrates an example scenario where evaluation is required for distance and speed. As indicated in FIG. 1B, the vehicle 100 in a lane 120 may be passing by a cyclist 125 in a bike lane 130. The developer/engineer may need to evaluate the distance of the vehicle 100 to the cyclist 125 as well as the speed of the vehicle 100 when passing by the cyclist 125. FIG. 1C illustrates an example scenario where evaluation is required for orientation and speed. As indicated in FIG. 1C, the vehicle 100 may be driving in a curve 135. A developer/engineer may need to evaluate the orientation of the vehicle 100 as well as the speed of the vehicle 100. FIG. 1D illustrates an example scenario where evaluation is required for yield relationship. As indicated in FIG. 1D, the vehicle 100 may be at an intersection making a left turn. There may be another vehicle 140 beside vehicle 100 going straight. Another vehicle 145 may be coming from an opposite direction with respect to vehicle 100. A developer/engineer may need to evaluate a yield relationship between vehicle 100 and each of the two other vehicles, respectively.

Usually the developers/engineers may need to write the evaluation scripts from scratch for each scenario that needs to be evaluated, which is very cumbersome and time consuming. As an example and not by way of limitation, for the example in FIG. 1A the developer/engineer may need to write the evaluation script for each scenario, i.e., distance to left lane boundary 110 and distance to right lane boundary 115. As another example and not by way of limitation, for the example in FIG. 1B the developer/engineer may need to write the evaluation script for each scenario, i.e., distance to the cyclist 125 and the speed of the vehicle 100. As another example and not by way of limitation, for the example in FIG. 1C the developer/engineer may need to write the evaluation script for each scenario, i.e., the orientation of the vehicle 100 and the speed of the vehicle 100. As yet another example and not by way of limitation, for the example in FIG. 1D the developer/engineer may need to write the evaluation script for each scenario, i.e., whether vehicle 100 successfully yields to vehicle 145 and passes vehicle 140 without yielding to it. As can be seen, writing individual evaluation script for each scenario to be evaluated is cumbersome and time consuming. When there are a vast number of scenarios to be evaluated, it may put a lot of burden to the developer/engineer. In addition, conventional evaluation approaches may be too rigid and their evaluate behavior may be only for certain components instead of the entire autonomy stack for autonomous driving (e.g., prediction, planning, controls, etc.) because of the non-modular characteristics associated with these approaches.

To address the aforementioned issues, the embodiments disclosed herein present an evaluation framework that provides developers/engineers convenience to quickly perform evaluations with modularity and flexibility. The evaluation framework may use modular pieces, i.e., calculators and validators, that are individually configurable using configuration files. The modular/configurable pieces may also promote code reuse, which further simplifies the work for the developers/engineers. The evaluation framework may provide the flexibility for calculators to work together or with a filter to output metrics, and the metrics can be validated by the validators. The evaluation framework may specify that the calculator configurations and validator configurations are not tied to or specified by the data log. Instead, the calculator configurations and validator configurations may be separate. As a result, the evaluation framework may have several technical advantages. Firstly, the evaluation framework may beneficially run different data on the same calculator/validator configurations to test performance across different releases/versions of the entire autonomy stack for autonomous driving (e.g., prediction, planning, controls, etc.). Secondly, the evaluation framework may output metrics and perform aggregation or analysis separately without running validators. For example, the examples scenarios in FIGS. 1A-D require evaluation of non-binary metrics which don't necessarily yield binary pass/fail results. For these scenarios, the evaluation framework can effectively generate metrics without running validators. Thirdly, if some thresholds for validation need to be changed, one may only need to rerun the validators on the metrics that have already been generated by the metric calculators without the need to rerun the metric calculators using the evaluation framework.

Figure 2:
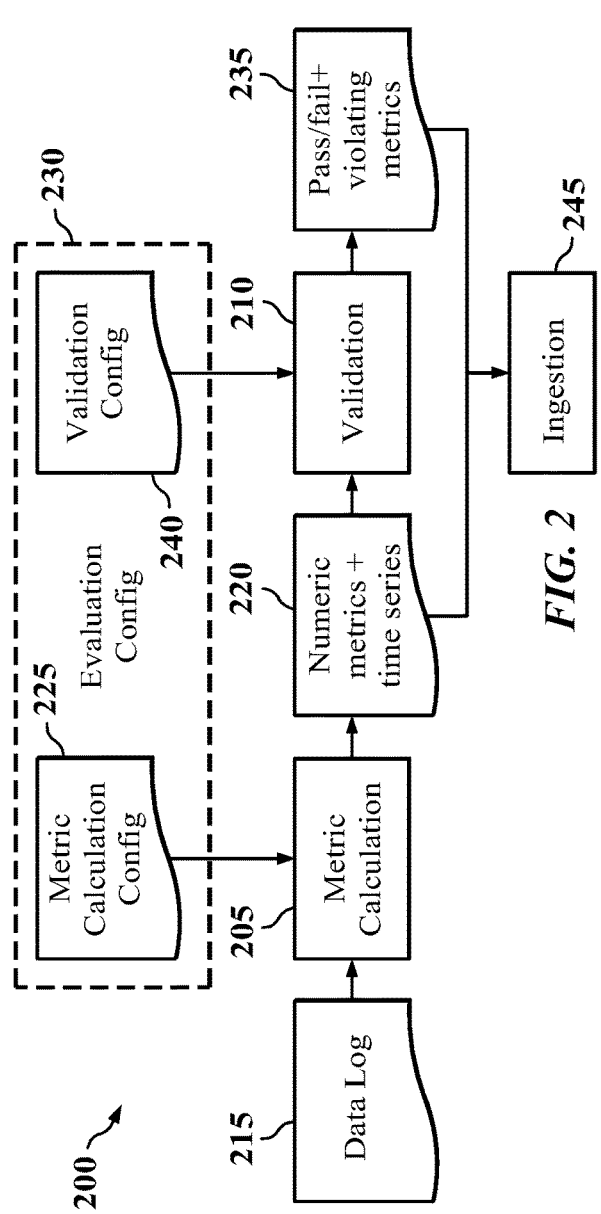
FIG. 2 illustrates an example evaluation workflow based on the evaluation framework.

The evaluation framework as disclosed herein may evaluate vehicle behaviors deduced from the driving data and other artifacts (e.g., semantic maps) generated by simulation or on-vehicle missions and output pass/fail results and metrics according to certain criteria. FIG. 2 illustrates an example evaluation workflow 200 based on the evaluation framework. In particular embodiments, the evaluation framework may comprise two systems, i.e., metric calculation 205 and validation 210. Metric calculation 205 may take in the data log 215 and outputs numeric metrics and time series metrics 220 for particular driving data in the data log 215 by using metric calculation configuration 225 comprised in an evaluation configuration file 230. The numeric information may be not a binary pass/fail result. As an example and not by way of limitation, the numeric information may be a vehicle's speed, acceleration, or distance from obstacles, etc. In particular embodiments, validation 210 may indicate the process that validates metrics or vehicle behavior against some expectations and outputs pass/fail results. Validation 210 may take in the numeric and time series metrics 220 outputted by metric calculation configuration included in the evaluation configuration file, and output validation results 235 by using validation configuration 240 included in the evaluation configuration file 230. As an example and not by way of limitation, the validation results 235 may comprise pass/fail results, violating metrics, and/or debugging information. In particular embodiments, the numeric and time series metrics 220 and the validation results 235 may be provided to ingestion 245 for developers/engineers to use.

In particular embodiments, a computing system may receive a request for evaluating driving data included in a data log 215. The computing system may then access, based on the request, an evaluation configuration file 230 that includes (i) a metric-calculation configuration 225 specifying one or more metric calculators configured to generate one or more output metrics from the driving data, and (ii) a validation configuration 240 configured to validate the one or more output metrics. The computing system may instantiate the one or more metric calculators specified by the metric-calculation configuration 225 included in the evaluation configuration file 230. In particular embodiments, the computing system may then determine particular driving data from the driving data included in the data log 215 based on the one or more instantiated metric calculators. The computing system may further generate the one or more output metrics 220 for the particular driving data by using the instantiated one or more metric calculators. In particular embodiments, the computing system may receive new driving data different from the driving data included in the data log. The computing system may then generate the one or more output metrics for the new driving data based on the metric-calculation configuration by using the instantiated one or more metric calculators on the new driving data.

In particular embodiments, metric calculators may output metrics 220 without pass/fail results. Validators may output pass/fail results based on some criteria without metrics 220. In particular embodiments, each of the one or more metric calculators may comprise at least one of a numeric metric calculator or a time series metric calculator. The one or more output metrics, generated by using the instantiated one or more metric calculators, may comprise at least one numeric metric and at least one time series metric. Correspondingly, the evaluation configuration file 230 may comprise instances of metric calculator configurations, validator configurations, and other global configurations (e.g., semantic map) for the evaluation framework 200. The evaluation configuration file 230 may specify which metric calculator or validator to instantiate for the framework 200 and configurations to use for each metric calculator or validator. In particular embodiments, the computing system may validate the at least one numeric metric and the at least one time series metric by using the validation configuration. The validating may comprise determining whether the at least one numeric metric and the at least one time series metric satisfy one or more expected threshold values. If the at least one numeric metric and the at least one time series metric satisfy the one or more expected threshold values, the computing system may publish a pass result, else if the at least one numeric metric and the at least one time series metric fail to satisfy the one or more expected threshold values, the computing system may publish a fail result.

In particular embodiments, the evaluation configuration 230 may be based on human-readable data-serialization language. Metric calculator or validator configurations may be usually parameter files used by the metric calculators or validators at the runtime to compute metrics 220 or validation results 235 under different scenarios and settings. In particular embodiments, validator configuration 210 may reference the metrics 220 the validators validate. The code for the configurations may be modular and reusable, which allows fast iteration on metric calculation and validation configurations. The evaluation framework 200 may conduct reliable and end-to-end validation.

In particular embodiments, the one or more output metrics 220 may comprise one or more of a trajectory metric, a distance magnitude, a longitudinal distance from obstacles, a lateral distance from obstacles, a vehicle state, or a custom-defined metric. As an example and not by way of limitation, a vehicle's trajectory metric may be center position, bounding box position, orientation, linear/angular velocity, linear/angular acceleration, or accumulated distance, etc. As another example and not by way of limitation, a vehicle's distance magnitude may be longitudinal/lateral distance from obstacles. As another example and not by way of limitation, a vehicle's state may be steering wheel angle, etc. As another example and not by way of limitation, a custom-defined metric may be time to contact, weaving metrics, or creeping metrics, etc.

In particular embodiments, the evaluation framework 200 may measure some metrics 220 when certain conditions are satisfied instead of for the entire duration of input driving data. The computing system may determine a certain condition is satisfied, identify a certain portion of the driving data corresponding to the certain condition, and generate the one or more output metrics for the certain portion of the driving data. e.g., speed in the turn, speed when passing cyclist, etc.) As an example and not by way of limitation, the conditions may comprise vehicle being in a certain region (used for measuring vehicle's speed profile in turns), vehicle's traveled distance being within a range (used for trimming the beginning and end of a simulated driving data, as simulation result may be unstable during those time periods in simulation), vehicle being in some relationship with an agent (e.g., vehicle's speed when passing a cyclist).

In particular embodiments, a threshold validator may validate that multiple numeric metrics or time series metrics outputted by one metric calculator are within their respective thresholds. The evaluation framework may have two types of threshold validators, i.e., numeric metric threshold validators and time series metric threshold validators. The time series metric threshold validators may allow users to configure things such as violation tolerances, which allows a time series metric to violate the threshold for a short period of time, in order to account for noises in the driving data. For some scenarios such as whether a vehicle arrives at destination within a certain time and traffic rules not involving other agents, the evaluation framework may use threshold validators plus some metric calculators that measure metrics describing a vehicle's behavior to perform validation. As an example and not by way of limitation, the yield behavior may be described by a metric of "the timestamp of vehicle entering the intersection region minus the timestamp of an agent exiting the intersection region", which may be expected to be positive if the vehicle is expected to yield to the agent. In particular embodiments, the threshold validator may output "pass" if all of its threshold checks pass. As an example and not by way of limitation, the evaluation framework 200 may validate whether a vehicle's speed is below the speed limit of the lane it's in, whether a vehicle stays in its lane in scenarios not involving lane changes (e.g. when lane changing is disabled), a vehicle's behavior at stop intersections without other agents, a vehicle's response to traffic lights, a vehicle's interactions with agents. Since determining how a vehicle should behave in the aforementioned situations may be not always obvious and need planning-like logic, human input to specify the expected behavior may be used. As an example and not by way of limitation, the input may comprise whether a vehicle passes/doesn't pass certain agents, or yields/doesn't yield to certain agents in certain regions.

In particular embodiments, some metrics 220 may be needed for validation while others may not. As an example and not by way of limitation, the time difference for yield relationship may be needed for validation. As a result, the computing system may store all metrics 220 in the metric-calculation configuration 225. In alternative embodiments, the computing system may enable the developers/engineers to configure whether a metric calculator's metric should be persisted in the metric-calculation configuration 225. The computing system may validate the one or more output metrics by using the validation configuration. In particular embodiments, the validating may comprise comparing the output metrics against a single threshold for a plurality of different conditions using a generic validator specified by the validation configuration. As a result, the evaluation framework may have more flexibility of evaluation under different conditions than conventional evaluation approaches which are too rigid.

In particular embodiments, the evaluation framework 200 may decouple metric calculation 205 from validation 210, which enables itself to be used in various workflows besides a simulation test. As an example and not by way of limitation, such workflows may comprise scenario feature extraction, performance measurement, etc. On the other hand, it may be also valuable to just utilize the metrics 220 outputted by the metric calculation 205 because it gives developers/engineers greater flexibility in designing the validators.

In particular embodiments, the metric-calculation configuration 225 and validation configuration 240 in the evaluation configuration 230 may be defined as serialized data structures. As an example and not by way of limitation, the configurations may be written in a human-readable data-serialization language. Such configurations may support adding new configurations and overriding existing configurations. The metric-calculation configuration may be based on one or more generic code snippets reusable for a plurality of different conditions. In this way, the computing system may evaluate the driving data for a condition from the plurality of different conditions upon receiving a user input based on the one or more generic code snippet. In other words, developers/engineers may write from generic, reusable code for various scenarios. As a result, developers/engineers may be able to add new configurations to existing evaluation configurations 230 and test configurations conveniently.

Figure 3:
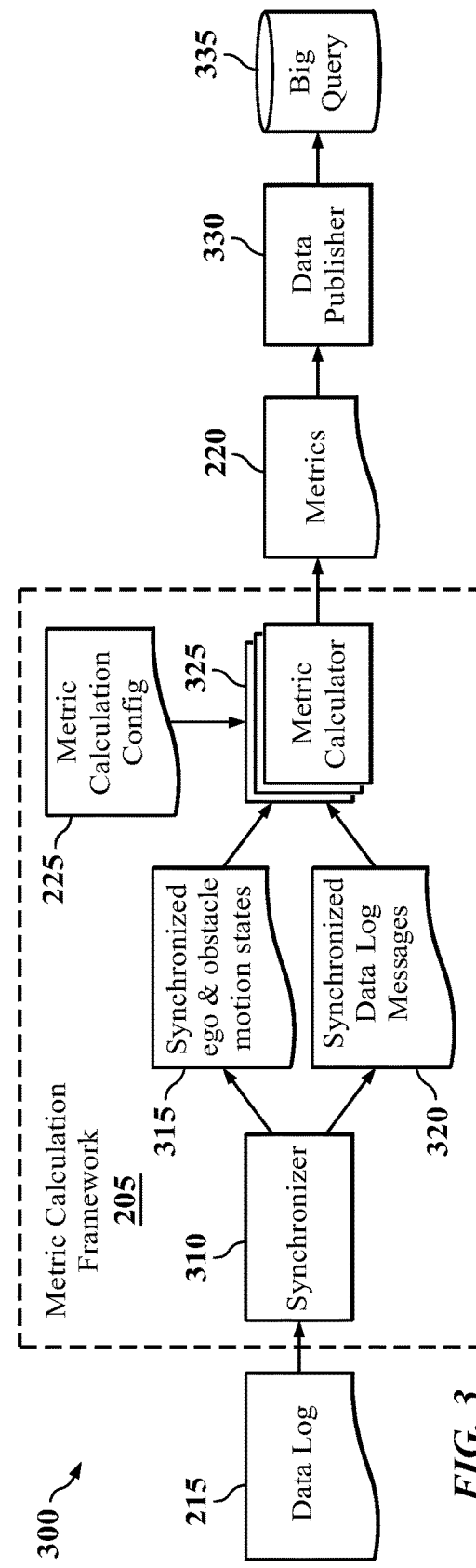
FIG. 3 illustrates an example workflow for metric calculation.

FIG. 3 illustrates an example workflow 300 for metric calculation 205. As indicated in FIG. 3, the metric calculation system 205 may take in the data log 215 using a synchronizer 310. The synchronizer 310 may generate synchronized vehicle and obstacle motion states 315 and synchronized data log messages 320. The synchronizer may allow different time series metric calculators to output time series metrics with synchronized timestamps, which makes it easier to associate these metrics in analytics. The synchronized vehicle and obstacle motion states 315 and synchronized data log messages 320 may be processed by one or more metric calculators 325. The computing system may feed the one or more of the synchronized vehicle motion state, the synchronized agent motion state, or the synchronized data log message 320 to the metric-calculation configuration 225. The metric calculators 325 may use metric-calculation configuration 225 to generate metrics 220. The metrics 220 may be sent to a data publisher 330, which may store the metrics 220 in a "BigQuery" data store 335. The data store 335 may enable developers/engineers to query generated metrics 220 for particular driving data in the data log 215.

In particular embodiments, there may be three types of building blocks in the metric-calculation system 205: time series metric calculators, numeric metric calculators and metric filters. Each metric filter may filter the driving data based on a specific condition and a range of values associated with the specific condition. As an example and not by way of limitation, a specific condition may be whether a vehicle is in/out of certain regions, which may be used for excluding intersections in calculating the vehicle's distances to lane boundaries. As another example and not by way of limitation, a specific condition may be whether a vehicle's traveled distance is in/out of certain ranges, which may be used for excluding the start and end of simulation in calculating weaving metrics. In particular embodiments, metric filters may be used to filter time series metric calculators.

In particular embodiments, the metric-calculation configuration 225 may further specify at least a metric filter and a corresponding metric group. A configuration associated with the metric group may specify matches between the at least metric filter and one or more time series metric calculators. Besides that, in the metric-calculation configuration 225, the developers/engineers may specify one or more of time series metric calculator configurations, metric filter configurations, numeric metric calculator configurations, or numeric metric group configurations to reference numeric metric calculators. The developers/engineers may have the option to specify whether to publish some metric groups in the metric group configurations.

The following is an example pseudo code for metric-calculation configuration 225.

```
List names of metric calculators to be configured {
    Configure time series metric calculator names
    ...
    Configure metric filter names
    ...
    Configure time series metric group names
    ...
    Configure numeric metric calculator names
    ...
    Configure numeric metric group names
List a configuration for time series metric calculators {
  e.g., configure a lane_boundary_distance metric calculator and a
weaving metric calculator
    ...
}
List a configuration for metric filters {
    e.g., configure a region-based metric filter and a distance-based
    metric filter
    ...
}
List a configuration for time series metric groups {
    ...
}
List a configuration for numeric metric calculators {
    e.g., configure a yield metric calculator and a pass metric calculator
    ...
}
List a configuration for numeric metric groups {
    ...
}
```

In particular embodiments, the validation configuration 240 may comprise a map from validator names to validator configurations. An entry in this map may indicate the usage of a validator in the evaluation run. In particular embodiments, the computing system may validate the one or more output metrics by using the validation configuration 240. The validation configuration 240 may specify one or more validators. Accordingly, validating the one or more output metrics 220 by using the validation configuration 240 may comprise instantiating the one or more validators specified by the validation configuration 240 included in the evaluation configuration file 230 and generating one or more validation results 235 by processing the one or more output metrics 220 using the instantiated one or more validators.

A metric calculator may output multiple numeric metrics or multiple time series metrics. These two types of metrics may correspond to two types of metric calculators. That is to say, a numeric metric calculator may output numeric metrics whereas a time series metric calculator may output time series metrics. In particular embodiments, each of the one or more metric calculators may be associated with a metric calculator name and its corresponding output metric 220 may be associated with a metric name. The validation configuration 240 may reference the metric calculator name and the metric name. Metric calculator names may be specified in the metric calculation section of the evaluation configuration 230. Metric names may be specified in metric calculator classes. In particular embodiments, the names of the metrics 220 outputted by a metric calculator class may be documented in a centralized place, such that developers/engineers may find out which metric names to reference.

In particular embodiments, in some use cases different thresholds may be applied to the same metric based on some additional criteria for validation. As an example and not by way of limitation, the additional criteria may comprise agent type when evaluating the lateral distances to obstacles. As another example and not by way of limitation, the additional criteria may comprise whether to yield to some agents when evaluating a vehicle's yield relationship with regards to other agents. In particular embodiments, applying different thresholds to the same metric may be based on doing the filtering in metric calculators and configuring multiple instances of metric calculators, one for each threshold. In particular embodiments, a complex use case may require applying different thresholds to a first time series metric based on the value of a second time series metric, e.g., applying different thresholds to a vehicle's distance from lead vehicle based on the vehicle's speed. The complex use case may result in too many instances of metric calculators and verbose configurations. In such a case, one may apply alternative approaches to apply different thresholds. As an example and not by way of limitation, one may compute a derived metric from the first time series metric and the second time series metric, apply a single threshold on it, and create a conditional threshold validator that applies threshold to the first time series metric only when the value of the second time series metric is within some range.

The following is an example pseudo code for validation configuration 240.

```
List names of validators to be configured {
    configure the name of a validator}
List a configuration for validators {
    {e.g., configure a threshold validator for a numeric metric and a
threshold validator for a time series metric
    ...
}
Configure the threshold validator for the numeric metric {
    Reference the name for a numeric metric group
    Define thresholds for the numeric metrics in the group
}
Configure the threshold validator for the time series metric {
    Reference the name for a time series metric group
    Define thresholds for the time series metrics in the group
}
}
```

As illustrated by the above examples, the evaluation framework 200 may have a technical advantage that each metric calculator/validator outputs structured information and they are constructed based on structured, composable configurations from modular, reusable code pieces. The structured information may be useful for debugging.

The following is an example configuration of pseudo code for evaluation of distances to lane boundaries. The configuration for time series metric calculator may comprise a "lane_boundary_distance" metric calculator, which may output two time series metrics, i.e., one for the distance to the left lane boundary and one for the distance to the right lane boundary. The metric calculation 205 may need to exclude intersections. Accordingly, a region-based metric filter may be used when configuring the metric filter. The group configuration may reference the name of the time series metric calculator and the name of the time series metric filter When configuring the validator, the validator may be applied to distances to lane boundaries by configuring a "time_series_metric_threshold_validator". The validation configuration 240 may further reference the name of the metric group and configure different thresholds for different metrics. As an example and not by way of limitation, for distance to left lane boundary, one may care about the maximum distance, for which the maximum threshold is −0.5. As another example and not by way of limitation, for distance to right lane boundary, one may care about the minimum distance, for which the minimum threshold is 0.5.

```
Configure metric calculation:
    Configure time series metric calculators:
        Configure a lane_boundary_distance metric calculator:
        ...
    Configure metric filter:
    Configure time series metric group:
        Reference the name of the time series metric calculator
            metric_calculator_name:
            vehicle_distances_to_lane_boundaries
        Reference the name of the time series metric filter
        ...
Configure validation:
    Configure validator: validator_configs:
        configure a time series metric threshold validator:
        Define thresholds for time series metrics:
            Reference a metric name defined in the metric group
            ...
```

In particular embodiments, for distance to lane boundaries evaluation, the computing system may need to check that a vehicle's distances to lane boundaries are within some thresholds in all regions except specified off regions. As an example and not by way of limitation, the configuration for distance to lane boundaries evaluation may comprise of a RegionBasedMetricFilter configuration, a LaneBoundaryDistanceMetricCalculator configuration, and a TimeSeriesMetricThresholdValidator configuration. As can be seen, for the example in FIG. 1A of evaluating data of vehicle driving in a lane, a developer/engineer may easily use the evaluation framework 200 to perform the evaluation. For example, the configuration for evaluating distance to lane boundaries evaluation may comprise a RegionBasedMetricFilter configuration that specifies a region to check a vehicle's distance, a LaneBoundaryDistanceMetricCalculator configuration that determines distance to lane boundaries, and a TimeSeriesMetricThresholdValidator configuration that validates the output distance to lane boundaries. Since FIG. 1A introduces a scenario where one can have two instances of measuring distance to lateral boundary (i.e., right and left lane boundaries), a developer/engineer may configure a single instance of lateral distance with a single validator (e.g., a single threshold for both left and right lane boundaries) to evaluate performance or two instances of lateral distance with two different validators (e.g., two different thresholds for left and right lane boundaries, respectively) to evaluate performance. The developer/engineer may just need to specify the data to be processed by the lateral distance calculator. The outputs from each calculator may be also hooked up to multiple different validators. As indicated above, the evaluation framework may have the technical advantage of not being dependent upon the data log to specify what metric calculator to use.

For lateral distance to obstacles evaluation, one may apply different thresholds to cars and cyclists. In particular embodiments, there may be two ways of evaluating lateral distance to obstacles. The first way may be configuring two instances of ObstacleLateralDistanceMetricCalculators, one for cars and the other for cyclists and then configuring two TimeSeriesMetricThresholdValidators, one targeting the metric calculator for cars and the other targeting the metric calculator for cyclists. When configuring the validators, the information not in the configuration file may be the metric name, which may be defined in each metric calculator's code and documented in a centralized place.

The following is an illustration of an example configuration of pseudo code for the first approach. As an example and not by way of limitation, the configuration for the calculator for lateral distances to cars may specify that the vehicle's lateral distances to the obstacles be within a longitudinal distance range. The configuration may further specify that this is for calculating distances to cars. As another example and not by way of limitation, the configuration for the metric calculator for lateral distances to cyclists may be the same as above except the specification that this is for calculating distances to cyclists. The configuration may further configure the metric group for the above two time series metrics. The validation configuration 240 may comprise the configuration for the validators for lateral distances to cars and cyclists, respectively.

```
Configure metric calculation:
    Configure time series metric calculators:
        Configure a metric calculator for lateral distances to cars.
        ...
        Configure a metric calculator for lateral distances to cyclists.
        ...
    Configure a time series metric group:
Configure validation:
    Configure validators:
        Configure a validator for lateral distances to cars.
        Configure a validator for lateral distances to cyclists.
```

The second way may be configuring one instance of ObstacleLateralDistanceMetricCalculator for all types of obstacles. In this approach, one may have ObstacleLateralDistanceMetricCalculator output agent type in its metrics' metadata. Additionally, one may configure two time series metric groups and two instances of TimeSeriesMetricThresholdValidators that reference the two metric groups. Each metric group filter metrics on the agent type may be in metric metadata (i.e., key-value pairs). The second approach may be simple for metric calculator configuration and implementation. A developer/engineer may only need to configure one metric calculator for all agent types, and the metric calculator may not need to filter agents by type.

The following is an illustration of an example configuration of pseudo code of the second approach. As can be seen, for this approach, the configuration for metric calculators does not differentiate between different types of obstacles. Instead, there may be one metric calculator for lateral distances to all types of obstacles. In the metric group configuration, the metric filter based on agent types may be applied to filter metrics from either distances to cars or distances to cyclists. The validation configuration 240 may be similar to that of the first approach.

```
Configure metric calculation:
    Configure time series metric calculator:
        Configure a metric calculator for lateral distances to all types of
        obstacles.
        Configure a time series metric group:
            Filter metrics by metric metadata, which contains agent type.
Configure validation:
    Configure validators:
        Configure a validator for lateral distances to cars.
        Configure a validator for lateral distances to cyclists.
```

As can be seen, for the example in FIG. 1B of evaluating speed of a vehicle and its distance to a cyclist, a developer/engineer may easily use the evaluation framework 200 to perform the evaluation. For example, the configuration for evaluating distance to a cyclist and the associated speed may comprise a RegionBasedMetricFilter configuration that specifies a region to evaluate such scenario, an ObstacleDistanceMetricCalculator configuration that determines distance to an obstacle (e.g., a cyclist), a SpeedMetricCalculator configuration that determines the speed of the vehicle, and a TimeSeriesMetricThresholdValidator configuration that validates the output distance to an agent and the associated speed. The developer/engineer may just need to specify the data to be processed by the distance calculator and the speed calculator. The outputs from each calculator may be also hooked up to multiple different validators. As indicated above, the evaluation framework may have the technical advantage of not being dependent upon the data log to specify what metric calculator to use.

Similarly, for the example in FIG. 1C of evaluating speed and orientation of a vehicle, a developer/engineer may easily use the evaluation framework 200 to perform the evaluation. For example, the configuration for evaluating speed and orientation may comprise a RegionBasedMetricFilter configuration that specifies a region (e.g. a curve) to evaluate such scenario, an OrientationMetricCalculator configuration that determines the orientation of the vehicle, a SpeedMetricCalculator configuration that determines the speed of the vehicle, and a TimeSeriesMetricThresholdValidator configuration that validates the output speed and orientation. The developer/engineer may just need to specify the data to be processed by the orientation calculator and the speed calculator. The outputs from each calculator may be also hooked up to multiple different validators. As indicated above, the evaluation framework may have the technical advantage of not being dependent upon the data log to specify what metric calculator to use.

The following is an example of validating that a vehicle yields to some agents and doesn't yield to some other agents. To begin with, the computing system may identify the intersection between the vehicle's and the agent's swept areas for every vehicle-agent pair. In particular embodiments, the swept areas may comprise the areas swept by the vehicle's and the agent's bounding boxes plus some paddings in the run. The computing system may then calculate the difference between the timestamp the vehicle enters the intersection and the timestamp the agent exits the intersection for every vehicle-agent pair. The time difference may be positive for the agents to yield to, and zero or negative for the agents not to yield to. To validate the metrics, one may take an approach similar to the first approach for lateral distances to obstacles. That is to say, configuring two instances of YieldMetricCalculators, one for the agents to yield to and the other for the agents to not yield to, and then configuring two ThresholdValidators.

The following is an illustration of an example configuration of pseudo code. For every agent in the configuration of the metric calculator for the agents to yield to, this calculator may find out the intersection between the agent's swept area on its path and the vehicle's swept area, and calculate the time difference between the vehicle entering the intersection and the agent exiting the intersection. The configuration for such a calculator may also specify the identifiers of the agents the vehicle should yield to be the name of a. The configuration for the metric calculator for the agents not to yield to may specify the identifiers of the agents the vehicle should not yield to. The configuration may further configure the metric group for the above two numeric metrics. The validation configuration 240 may comprise the configuration for the validators for yielding to agents and not yielding to agents, respectively.

```
Configure metric calculation:
    Configure numeric metric calculators:
        Configure a metric calculator for the agents to yield to.
        ...
        Configure a metric calculator for the agents to not yield to.
        ...
    Configure a numeric metric group for the above calculators
    ...
Configure validation:
    Configure validators:
        Configure a validator for the agents to yield to.
        ...
        Configure a validator for the agents to not yield to.
        ...
```

As can be seen, the example in FIG. 1D of evaluating data of vehicle yielding to different agents, a developer/engineer may easily use the evaluation framework 200 to perform the evaluation based on the above metric-calculation configuration 225 and validation configuration 240. For example, the configuration may comprise a YieldMetricCalculator configuration that determines the yield relationship of the vehicle with respect to other agents and a TimeSeriesMetricThresholdValidator configuration that validates the output yield metric. A developer/engineer may configure two instances of yield metric calculators, one for the agents to yield to and the other for the agents to not yield to, and then configure two validators to evaluate performance. The developer/engineer may just need to specify the data to be processed by the calculators with agent identifiers. The outputs from each calculator may be also hooked up to multiple different validators. As indicated above, the evaluation framework may have the technical advantage of not being dependent upon the data log to specify what metric calculator to use.

Figure 4:
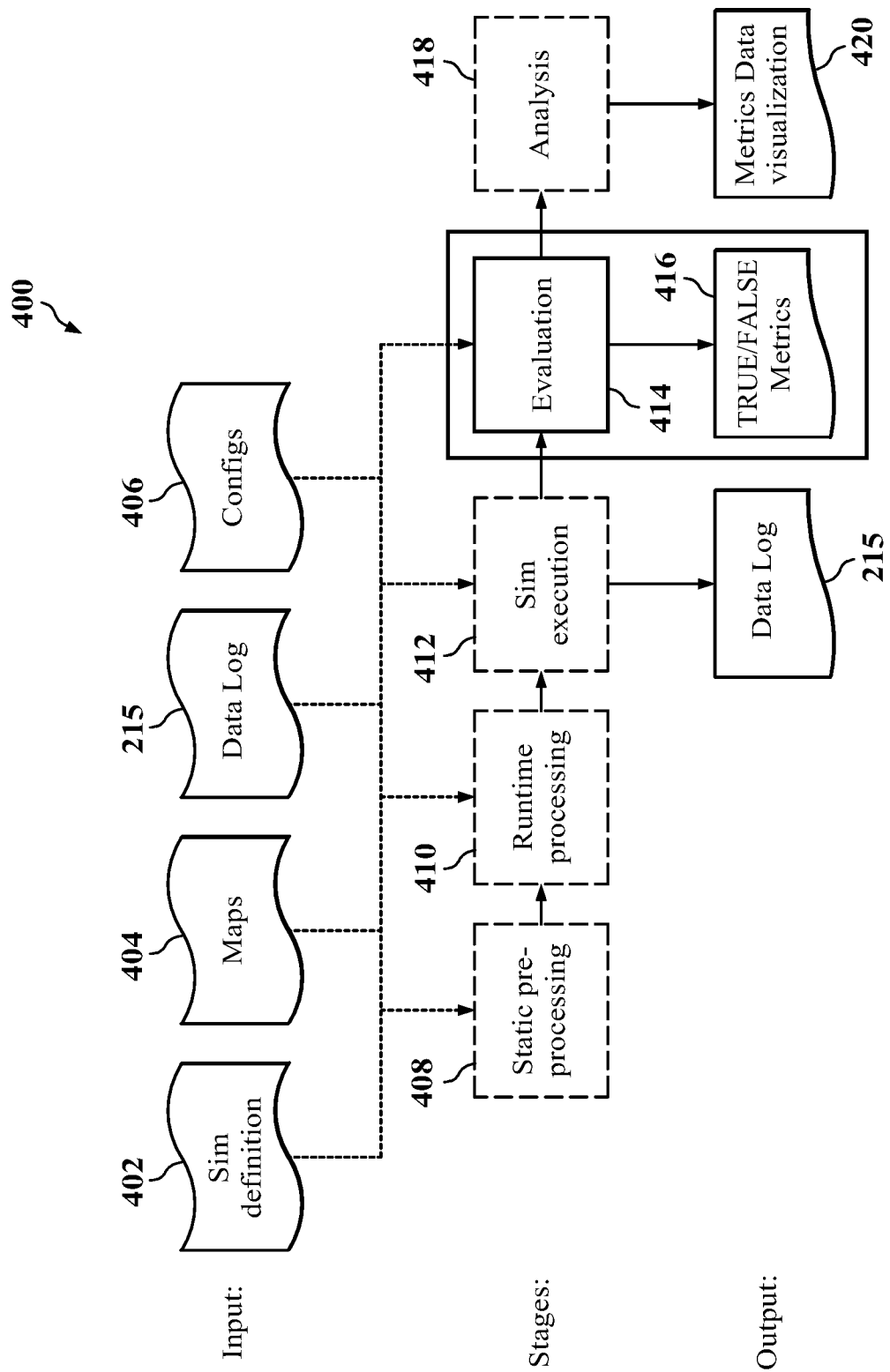
FIG. 4 illustrates an example simulation test workflow.

FIG. 4 illustrates an example simulation test workflow 400. In particular embodiments, the evaluation framework 200 may be used as part of a simulation test workflow 400. A simulation test workflow 400 may indicate the process that runs an instance of simulation and runs evaluation on the driving data generated from simulation. As indicated in FIG. 4, the input for the simulation test workflow 400 may comprise simulation definition 402, one or more maps 404, data log 215, and configurations 406. In particular embodiments, the configurations 406 may comprise the evaluation configuration 230. The simulation test workflow 400 may comprise several stages starting with the static pre-processing 408. After that, there may be a runtime processing stage 410. The computing system may then perform simulation execution 412, e.g., to generate simulated driving data. The output of simulation execution 412 may be stored in the data log 215. In particular embodiments, the simulation test workflow 400 may further comprise the evaluation stage 414. In particular embodiments, the evaluation stage 414 may be based on the evaluation test workflow. The evaluation test workflow may indicate the process that runs evaluation on the driving data generated by any means. Evaluation test workflow may not involve the generation of the driving data. The evaluation 414 may generate evaluation results 416. As an example and not by way of limitation, the evaluation results 416 may comprise true/false metrics as indicated in FIG. 4. The final stage of the simulation test workflow 400 may be an analysis stage 418. The analysis may be based on the output from the evaluation 414. As an example and not by way of limitation, the analysis result 416 may comprise a metrics data visualization to facilitate the developers/engineers to conveniently interpret the simulation test. As another example and not by way of limitation, the analysis result 416 may comprise vehicles' trajectories and contact evaluation, simulator fidelity such as vehicles' trajectories comparison, simulation-based metrics generations such as numeric values from a vehicle and other agents' trajectories, cross-test metric aggregation and statistics of metrics, and any suitable result comparison. In particular embodiments, the analysis may further provide simulation system diagnostics.

In particular embodiments, the separation of the metric-calculation configuration 225 and validation configuration 240 of the evaluation framework 200 may result in a technical advantage for the simulation test workflow in FIG. 4. The technical advantage may be that it may be not tied to running both metric-calculation and validation configuration files. This may be useful for simulation test as not all driving data has a validation configuration, e.g., planning metrics.

A simulation test configuration may comprise the simulation input and the evaluation configuration 230. In particular embodiments, the evaluation configuration 230 section may comprise three parts, i.e., base evaluation configuration file names, evaluation configuration overrides, and disabled validators. A base evaluation configuration may comprise a "metric_calculation_config" section and a "validation_config" section. It may not include other configurations or specify disabled validators.

The following is an illustration of an example configuration of pseudo code for simulation test 400. In particular embodiments, the configuration may first specify the simulation input which may comprise the particular data log 215 and what preprocessing should be done. The configuration may also comprise the evaluation configuration 230. The evaluation configuration 230 may specify the base evaluation configurations. The evaluation configuration 230 may also specify the evaluators. The evaluation configuration 230 may additionally comprise the configuration for the metric calculation and validation and specify disabled validators.

Specify simulation input
...
Configure evaluation
...
Specify base evaluation configurations:
...

-continued

Specify evaluators:
...
Configure metric calculation:
...
Configure validation:
...
Specify disabled validators:
...

In particular embodiments, besides supporting the simulation test 400, the evaluation framework 200 may support any independent evaluation test. As an example and not by way of limitation, the evaluation test may comprise regression and feature performance tests. The regression test may result in general vehicle behavior validation or a specific vehicle behavior validation. The evaluation framework 200 may also support evaluations on the driving data collected from vehicles.

Figure 5:
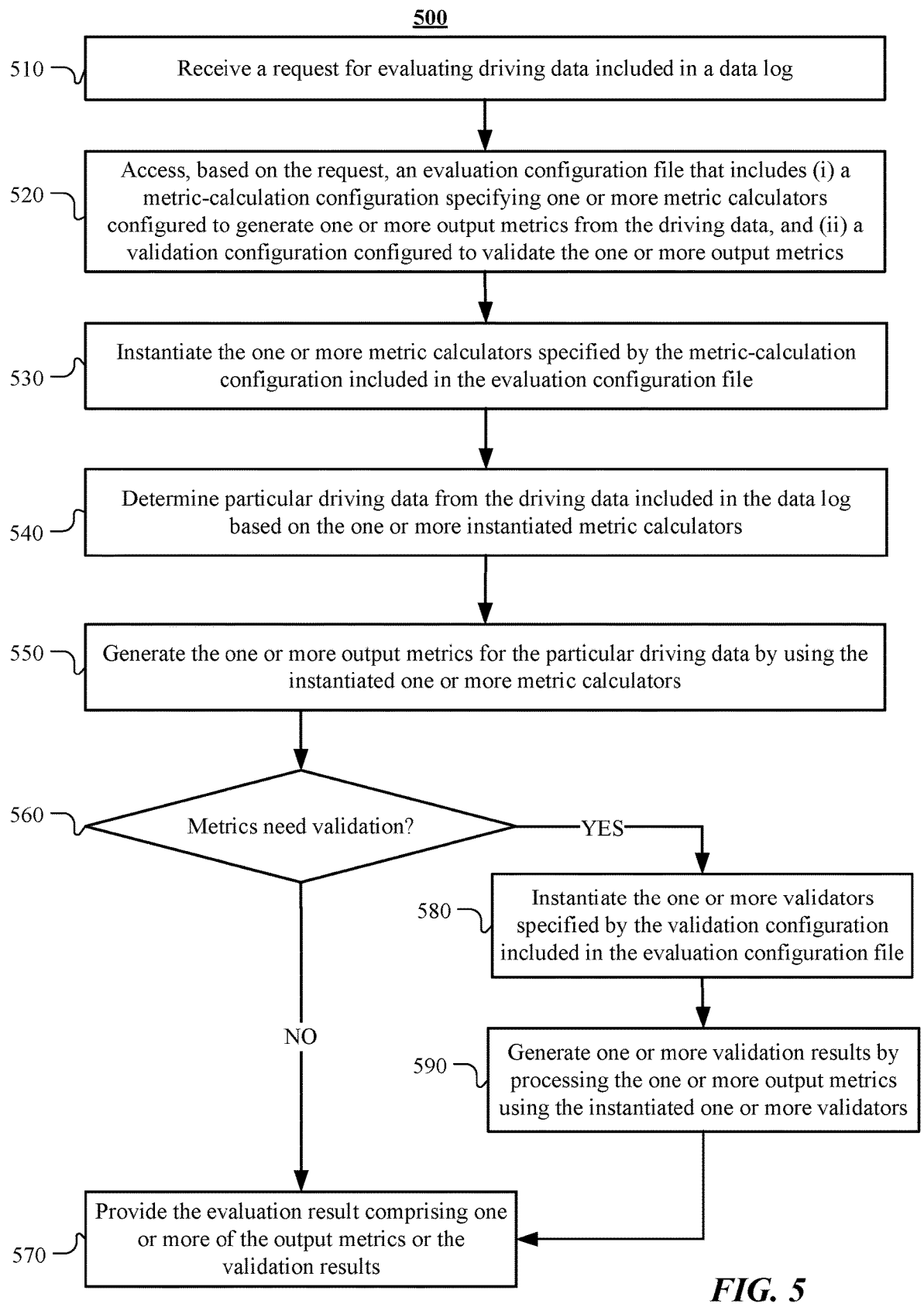
FIG. 5 illustrates an example of a method for evaluating particular driving data.

FIG. 5 illustrates an example method 500 for evaluating particular driving data. The method may begin at step 510, where the computing system may receive a request for evaluating driving data included in a data log 215. At step 520, the computing system may access, based on the request, an evaluation configuration file 230 that includes (i) a metric-calculation configuration 225 specifying one or more metric calculators configured to generate one or more output metrics from the driving data, and (ii) a validation configuration 240 configured to validate the one or more output metrics. At step 530, the computing system may instantiate the one or more metric calculators specified by the metric-calculation configuration 225 included in the evaluation configuration file 230. At step 540, the computing system may determine particular driving data from the driving data included in the data log 215 based on the one or more instantiated metric calculators. At step 550, the computing system may generate the one or more output metrics 220 for the particular driving data by using the instantiated one or more metric calculators. At step 560, the computing system may determine if the one or more output metrics 220 need validation. If the one or more output metrics 220 do not need validation, the computing system may provide the evaluation result comprising one or more of the output metrics 220 or the validation results 235 at step 570. If the one or more output metrics 220 need validation, the computing system may proceed to step 580, where the computing system may instantiate the one or more validators specified by the validation configuration 240 included in the evaluation configuration file 230. At step 590, the computing system may generate one or more validation results 235 by processing the one or more output metrics 220 using the instantiated one or more validators. The computing system may then proceed to step 570, where the computing system may provide the evaluation result comprising one or more of the output metrics 220 or the validation results 235. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for evaluating particular driving data including the particular steps of the method of FIG. 5, this disclosure contemplates any suitable method for evaluating particular driving data including any suitable steps, which may include all, some, or none of the steps of the method of FIG. 5, where appropriate.

Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
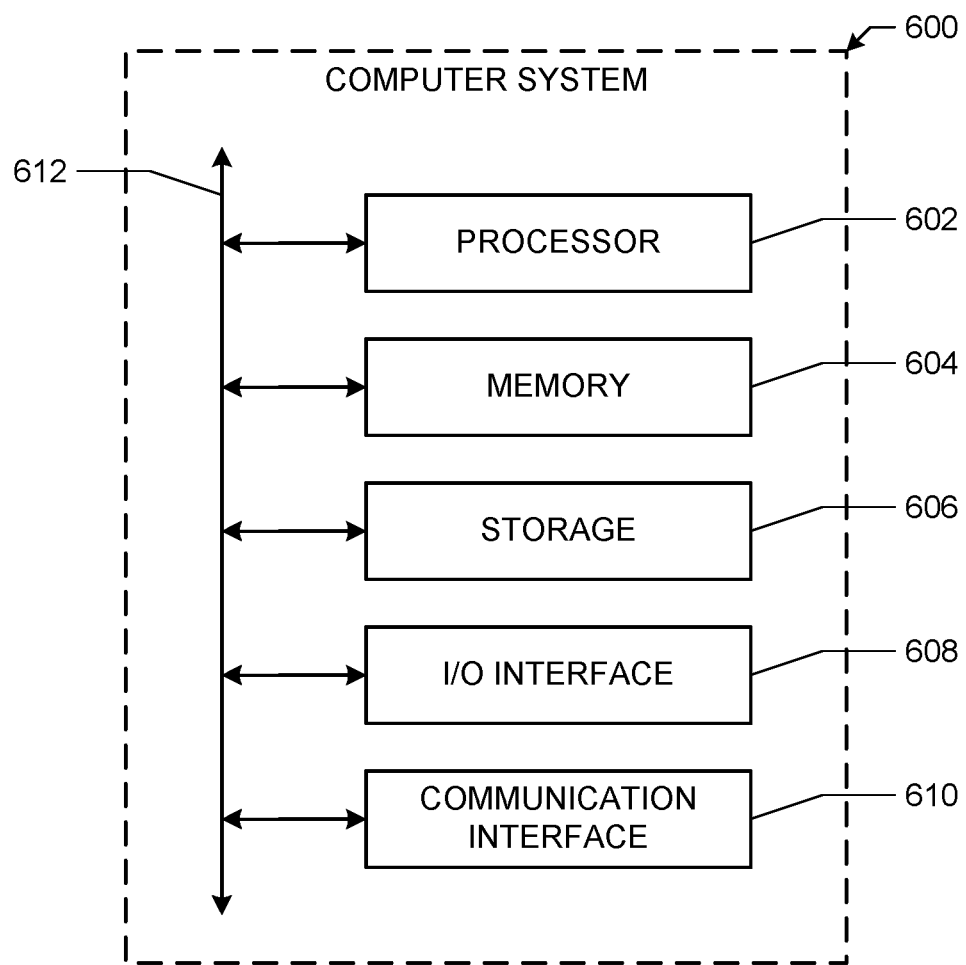
FIG. 6 illustrates an example of a computing system.

FIG. 6 illustrates an example computer system 600. In particular embodiments, one or more computer systems 600 perform one or more steps of one or more methods described or illustrated herein. In particular embodiments, one or more computer systems 600 provide the functionalities described or illustrated herein. In particular embodiments, software running on one or more computer systems 600 performs one or more steps of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 that are to be operated on by computer instructions; the results of previous instructions executed by processor 602 that are accessible to subsequent instructions or for writing to memory 604 or storage 606; or any other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs), be a multi-core processor, or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described in further detail below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
receiving a request for evaluating driving data included in a data log acquired from sensors of a vehicle;
instantiating, from an evaluation configuration file associated with the request, one or more metric-calculators configured to generate one or more output metrics from the driving data, wherein the evaluation configuration file specifies a validation configuration to validate the output metrics and a metric-calculation configuration specifying the metric calculators,
wherein instantiating includes modifying generic code snippets into modified snippets according to the metric-calculation configuration and compiling and executing, using an electronic processor, the modified snippets to implement the metric calculators by integrating information from the evaluation configuration file to adapt the generic code snippets;
determining particular driving data from the driving data included in the data log based on the one or more metric calculators; and
generating the output metrics for the particular driving data by using the metric calculators to calculate attributes about control of the vehicle, including dynamics of the vehicle and relationships to objects in a surrounding environment, and wherein the validation configuration specifies limits and conditions on the dynamics and the relationships to determine when control of the vehicle is satisfactory.

2. The method of claim 1, further comprising:
validating the one or more output metrics by using the validation configuration.

3. The method of claim 2, wherein the validation configuration specifies one or more validators, and wherein validating the one or more output metrics by using the validation configuration comprises:
instantiating the one or more validators specified by the validation configuration included in the evaluation configuration file; and
generating one or more validation results by processing the one or more output metrics using the one or more validators.

4. The method of claim 1, wherein each of the one or more metric calculators comprise at least one of a numeric metric calculator or a time series metric calculator, and the one or more output metrics, generated by using the instantiated one or more metric calculators, comprise at least one numeric metric and at least one time series metric.

5. The method of claim 4, further comprising:
validating the at least one numeric metric and the at least one time series metric by using the validation configuration, wherein the validating comprises:
determining whether the at least one numeric metric and the at least one time series metric satisfy one or more expected threshold values; and
if the at least one numeric metric and the at least one time series metric satisfy the one or more expected threshold values, publishing a pass result,
else if the at least one numeric metric and the at least one time series metric fail to satisfy the expected threshold values, publishing a fail result.

6. The method of claim 1, wherein the metric-calculation configuration further specifies one or more metric filters, wherein each metric filter filters the driving data based on a specific condition and a range of values associated with the specific condition.

7. The method of claim 1, wherein the one or more output metrics comprise one or more of a trajectory metric, a distance magnitude, a longitudinal distance from obstacles, a lateral distance from obstacles, a vehicle state, or a custom-defined metric.

8. The method of claim 1, further comprising validating the one or more output metrics by using the validation configuration, wherein the validating comprises comparing the output metrics against a single threshold for a plurality of different conditions using a generic validator specified by the validation configuration.

9. The method of claim 1, wherein the metric-calculation configuration is based on one or more generic code snippets reusable for a plurality of different conditions, wherein the method further comprises:
evaluating the driving data for a condition from the plurality of different conditions upon receiving a user input based on the one or more generic code snippets.

10. The method of claim 1, further comprising:
generating, by a synchronizer, one or more of a synchronized vehicle motion state, a synchronized agent motion state, or a synchronized data log message; and
feeding the one or more of the synchronized vehicle motion state, the synchronized agent motion state, or the synchronized data log message to the metric-calculation configuration.

11. The method of claim 1, further comprising:
determining a certain condition is satisfied;
identifying a certain portion of the driving data corresponding to the certain condition; and
generating the one or more output metrics for the certain portion of the driving data.

12. The method of claim 1, further comprising:
receiving new driving data different from the driving data included in the data log; and
generating the one or more output metrics for the new driving data based on the metric-calculation configuration by using the instantiated one or more metric calculators on the new driving data.

13. A system comprising: one or more processors and one or more computer-readable non-transitory storage media, the one or more computer-readable non-transitory storage media comprising instructions operable when executed by the one or more processors to cause the system to perform operations comprising:
receiving a request for evaluating driving data included in a data log acquired from sensors of a vehicle;
instantiating, from an evaluation configuration file associated with the request, one or more metric calculators configured to generate one or more output metrics from the driving data, wherein the evaluation configuration file specifies a validation configuration configured to validate the one or more output metrics,
wherein instantiating includes modifying generic code snippets into modified snippets according to the metric calculation configuration and compiling and executing, using an electronic processor, the modified snippets to implement the one or more metric calculators by integrating information from the evaluation configuration file to adapt the generic code snippets;

determining particular driving data from the driving data included in the data log based on the one or more metric calculators; and generating the output metrics for the particular driving data by using the one or more metric calculators to calculate attributes about control of the vehicle, including dynamics of the vehicle and relationships to objects in a surrounding environment, and wherein the validation configuration specifies limits and conditions on the dynamics and the relationships to determine when control of the vehicle is satisfactory.

14. The system of claim 13, wherein the one or more processors are further operable when executing the instructions to perform operations comprising:

validating the one or more output metrics by using the validation configuration.

15. The system of claim 14, wherein the validation configuration specifies one or more validators, and wherein validating the one or more output metrics by using the validation configuration comprises:

instantiating the one or more validators specified by the validation configuration included in the evaluation configuration file; and generating one or more validation results by processing the one or more output metrics using the one or more validators.

16. The system of claim 13, wherein each of the one or more metric calculators comprise at least one of a numeric metric calculator or a time series metric calculator, and the one or more output metrics, generated by using the one or more metric calculators, comprise at least one numeric metric and at least one time series metric.

17. One or more computer-readable non-transitory storage media including instructions that, when executed by one or more processors, are configured to cause the one or more processors to perform operations comprising:

receiving a request for evaluating driving data included in a data log acquired from sensors of a vehicle;

instantiating, from an evaluation configuration file associated with the request, one or more metric calculators configured to generate one or more output metrics from the driving data, wherein the evaluation configuration file specifies a validation configuration to validate the output metrics and a metric calculation configuration specifying the metric calculators, wherein instantiating includes modifying generic code snippets into modified snippets according to the metric calculation configuration and compiling and executing, using an electronic processor, the modified snippets to implement the metric calculators by integrating information from the evaluation configuration file to adapt the generic code snippets;

determining particular driving data from the driving data included in the data log based on the one or more metric calculators; and generating the output metrics for the particular driving data by using the metric calculators to calculate attributes about control of the vehicle, including dynamics of the vehicle and relationships to objects in a surrounding environment, and wherein the validation configuration specifies limits and conditions on the dynamics and the relationships to determine when control of the vehicle is satisfactory.

18. The media of claim 17, wherein the instructions are further configured to cause the one or more processors to perform further operations comprising:

validating the one or more output metrics by using the validation configuration.

19. The media of claim 18, wherein the validation configuration specifies one or more validators, and wherein validating the one or more output metrics by using the validation configuration comprises:

instantiating the one or more validators specified by the validation configuration included in the evaluation configuration file; and generating one or more validation results by processing the one or more output metrics using the one or more validators.

20. The media of claim 17, wherein each of the one or more metric calculators comprise at least one of a numeric metric calculator or a time series metric calculator, and the one or more output metrics, generated by using the instantiated one or more metric calculators, comprise at least one numeric metric and at least one time series metric.

\* \* \* \* \*